March 23, 1965 C. C. JOHNSON 3,175,163

CROSSED FIELD CYCLOTRON WAVE PARAMETRIC AMPLIFIER

Filed Oct. 1, 1959

CURTIS C. JOHNSON,
INVENTOR

BY David T. Anderson

ATTORNEY

United States Patent Office 3,175,163
Patented Mar. 23, 1965

3,175,163
CROSSED FIELD CYCLOTRON WAVE PARAMETRIC AMPLIFIER

Curtis C. Johnson, Rolling Hills, Calif., assignor to Hughes Aircraft Company, Culver City, Calif., a corporation of Delaware Filed Oct. 1, 1959, Ser. No. 843,762
1 Claim. (Cl. 330—4.7)

This invention relates to beam type parametric amplifiers and more particularly to low-noise, crossed-field cyclotron wave devices.

With the advent of parametric amplifiers, work has progressed in the developement of what has been designated as beam type parametric or pseudo-parametric amplifiers, hereinafter referred to as such, wherein a traveling wave associated with the stream of charged particles, usually electrons, is "parametrically" pumped. In conventional non-beam parametric amplifiers, amplification is achieved by the mechanism generally of pumping or altering a particular parameter of the circuit. This parameter is usually the magnitude of reactance of a nonlinear reactive element such as a capacitor. In such a case, the effective capacitance of the capacitor is varied at approximately twice the frequency of the signal to be amplified. The result can be an exchange of energy from the pumping means to the signal on the circuit. In a beam type "parametric" amplifier, the signal to be amplified is carried on moving waves associated with a particular pattern of motion in the charged particles of the stream. The energy of the pattern of motion may, as an illustrative analogy, be considered a "parameter" of the system which may be pumped by an appropriate method. The pumping results in adding energy to the pattern of charge motion which in turn amplifies the signal carried on the waves associated with the charge motion. It has been shown that in addition to the well-known fast and slow space charge waves, the slow one being normally used in traveling-wave tube amplifiers, cyclotron waves exist when the beam is in the environment of a magnetic field. It has been established that when the magnetic field is a longitudinal one, that is, parallel to the electron stream, a fast cyclotron wave and a slow cyclotron wave are propagated on the stream. Work with these fast waves, both the fast space charge wave and the fast cyclotron wave, has been spurred by the realization that extremely low noise amplification with them is possible. This is due to the fact that the fast waves exhibit positive alternating current power flow which means that by delivering energy to the particular wave its energy is increased; the reverse is the case with the slow wave normally dealt with in conventional traveling-wave tubes. The result is that the noise on the slow wave may not be removed because it exhibits negative alternating current power flow. However, the noise may be removed from the fast wave. The transverse-field coupler described below may in fact be utilized to remove the noise from the fast wave on the electron stream while at the same time modulating the stream with a signal to be amplified. The object of beam parametric amplifiers then is to amplify the fast wave containing the signal to be amplified. This may not be done by ordinary traveling-wave tube techniques wherein the fast wave can only lose energy, but it may be done parametrically in various ways. Then, by means of an output coupler which may again be a transverse-field coupler similar to the input coupler, the signal thus amplified, or pumped, may be removed and utilized. Such fast wave parametric amplifiers therefore exhibit extremely low noise. Wide bandwidth is also possible at the lower frequencies. The pumping mechanism is not narrow band. The bandwidth of the system is determined only by the means for coupling to the fast cyclotron wave. The device readily exhibits high gain and is at the same time unconditionally stable with regard to regenerative or feedback caused oscillations because the only connection between the input and the output of the system is the beam which flows only unilaterally.

Referring henceforth more particularly to a beam type parametric amplifier which utilizes the fast cyclotron wave, it is pointed out that the mechanism which permits the parametric pumping may be simply described as follows: The longitudinal magnetic field serves as a restoring force to keep the electrons flowing on the average along the desired path parallel to the magnetic field. When the electrons are given transverse components of velocity as by the parametric pumping, the energy thus added causes an oscillation or perturbation about the unperturbed path. The perturbation actually consists of cyclotron orbiting about the magnetic field. By thus adding energy to the orbiting electrons the magnitude of the fast cyclotron wave may be increased and any signals being carried by the cyclotron wave may thereby be amplified. The energy gained by the amplification is supplied by the parametric pump which increases the average radius of orbiting of the stream electrons.

The signal frequency must normally be equal to the cyclotron frequency of the electrons which is determined by the magnitude of the magnetic field. The required length of the system limits the maximum magnitude of magnetic field and, thereby, the maximum frequency which can be amplified. In the past, this maximum frequency has been in the S-band region, or approximately 2 to 4 kilomegacycles. Also, in the past undesired velocity fluctuations in the beam added to the noise figure of the system.

It is therefore an object of the present invention to provide a fast cyclotron wave parametric amplifier which does not suffer the disadvantages of the prior art.

It is another object to provide a fast cyclotron wave device which may be operated at amplifying frequencies greater than 10,000 megacycles.

It is a further object to provide an exceedingly low-noise, beam-type parametric amplifier.

It is still another object to provide a beam-type parametric amplifier having a decreased velocity fluctuation, both longitudinally and transverse, in the beam of charged particles.

It is yet another object to provide a low-noise parametric amplifier utilizing crossed fields.

It is another object to provide a fast cyclotron wave parametric amplifier utilizing a parametric pump which pumps in a longitudinal plane over substantially the entire length of the pump.

It is still a further object to provide a cyclotron-wave type parametric amplifier which does not require a longitudinal magnetic field.

Briefly, these and other objects are achieved in accordance with the present invention by providing an electron gun which projects a stream of electrons or other charged particles at a predetermined velocity through an environment of orthogonally crossed electric and magnetic fields perpendicular to the path of the stream. Particles having appreciable velocity fluctuations, either transverse or longitudinal, may be removed from the beam by a velocity sorter. The fast wave associated with the cyclotron component of motion of the charged particles with respect to the transverse magnetic field is coupled to, or modulated by, an input coupler which may couple the signal to be amplified to the fast cyclotron wave while at the same time removing the beam noise from the fast cyclotron wave. The cyclotron motion of the charged particles is then pumped to a larger magnitude of transverse deflection or orbiting radius by a parametric pump which may be a rectangular $TE_{201}$ cavity. Such a cavity may pump the beam over the entire length of the cavity to provide an exponential growth of the cyclotron component of motion. Subsequent to the pump cavity an output coupler is disposed which couples the energy from the fast cyclotron wave to an external circuit.

The novel features of this invention, as well as the invention itself, both as to its organization and method of operation, will best be understood from the following description, taken in conjunction with the accompanying drawing in which like reference numerals refer to like parts, and in which.

Figures 1, 2:
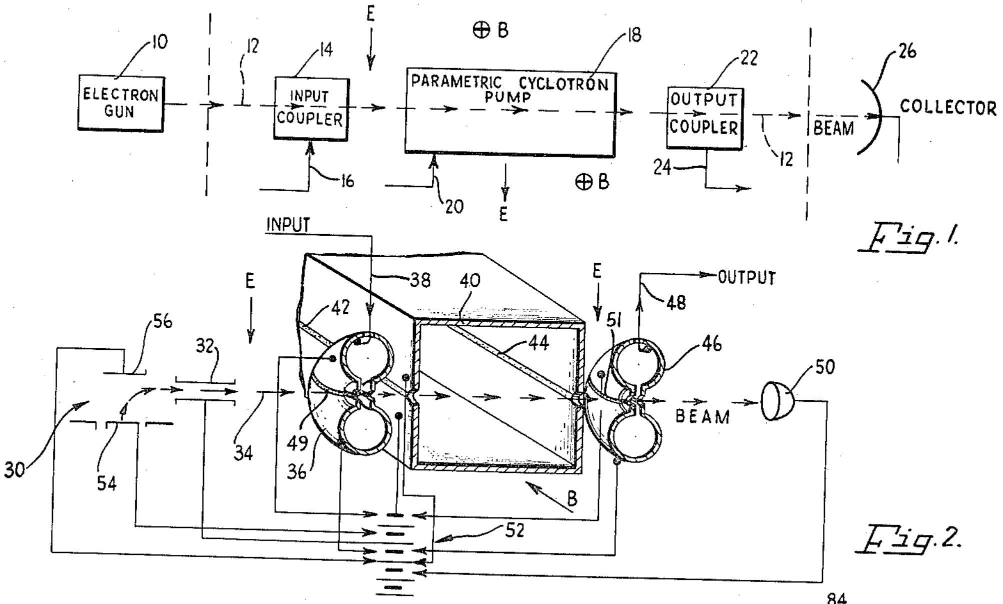
FIG. 1 is a schematic diagram of a cross-field parametric amplifier constructed in accordance with the present invention.
FIG. 2 is a simplified structural and schematic diagram of a specific example of the present invention.

Referring to FIG. 1, a schematic representation of the invention includes an electron gun 10 which projects an electron stream 12 into a crossed-field environment where the magnetic field B, indicated by an arrow tail as being directed perpendicularly into the plane of the drawing, the electron field E, indicated by an arrow as being directed vertically downwardly along the plane of the drawing, and the electron stream 12 are mutually orthogonal. The velocity of the electron stream for rectilinear flow in such environment and its relationship to the crossed-fields in appropriate units is given by the ratio $E/B$. The electron gun may be either the injected type shown with no magnetic field present in the gun region, or a conventional cross-field gun wherein the gun itself is immersed in the crossed-field environment and is disposed so that the initial velocity of the emitted electrons is at right angles to the stream 12. A collimator or velocity sorter, not shown, may be utilized in either case between the electron gun and the other components to remove electrons having transverse or longitudinal velocity fluctuations.

The electron stream 12 then passes through an input coupler 14 which may be any one of the types shown in more detail in FIGS. 4 to 7, its primary requirement being that it be a structure which will propagate a forward wave which will couple to the fast cyclotron wave of the electron stream. Cuccia has shown, for the case where the signal frequency equals the cyclotron frequency, that such a coupler may readily not only couple energy very effectively from an input line 16 to the fast wave on the stream, but will at the same time remove substantially all the noise from the same fast wave. See "An Electron Coupler" by C. C. Cuccia, RCA Review, volume 10, pages 270 to 303, June 1949.

The electron stream emerging from the input coupler 14 thus carries a fast cyclotron wave which is substantially noise free and which has been modulated by the signal to be amplified from the input line 16. The fast cyclotron wave energy is in the nature of a component of electron rotation about the transverse magnetic field B, while the stream drifts with a lineal component of velocity from left to right in the drawing. The resultant motion of the electrons as seen in the laboratory frame of reference is cycloidal.

The electron stream 12 then enters the pump cavity 18 which amplifies the fast cyclotron wave by adding energy to the cyclotron orbital motion of the electrons by providing a rotating electric field, the magnitude of which, near the axis, increases substantially linearly with radius from the center or axis of the electron stream. Thus the orbiting electrons are supplied with energy from the time-varying electric field pattern in the pump cavity. The pump power, supplied on an input line 20, excites the proper cavity mode at a frequency equal to approximately twice the cyclotron frequency of the orbiting electrons. Further details in connection with the cyclotron pump will be discussed particularly in connection with FIGS. 2 and 3. The electron stream 12, its orbiting electrons having been pumped to a greater radius of rotation, then enters an output coupler 22 which functions in a manner which is exactly the reverse of that of the input coupler 14. The fast cyclotron wave energy is completely coupled to the coupling structure which propagates the appropriate forward wave. The amplified signal is provided on an output line 24. The output coupler 22 would incidently cause noise to be added to the fast cyclotron wave at the same time that it was delivering its energy to the coupler. Thus, the electron stream 12 as it emerges from the output coupler 22 would contain noise on its fast cyclotron wave. However, the electron stream is collected by a collector electrode 26 and its kinetic energy dissipated therein. Thus, the noise placed on the stream by the output coupler 22 does not affect the amplification process.

It can be readily appreciated that such a crossed-field parametric amplifier which operates on the fast cyclotron wave may amplify signals of higher frequency than in the prior art devices where a longitudinal magnetic field is utilized. This advantage arises from the fact that the frequency of the signal to be amplified is limited by the cyclotron frequency of the electrons, which in turn is limited by the strength of the magnetic field being utilized for the cyclotron motion. Clearly, it is possible to provide a magnetic field which is higher by orders of magnitude across a small gap determined by the transverse dimension of the beam device, than a homogeneous longitudinal magnetic field which must extend over the entire length of the beam device. For additional details of and for a thorough discussion of the principles of operation in a fast wave parametric amplifier see the Hughes Aircraft Company Research Laboratories Technical Memorandum No. 540, "Theory of Fast Wave Parametric Amplification," by C. C. Johnson, published February 1959. In addition, the references included in the bibliography of this report are recommended for further background.

Referring more particularly to FIG. 2, there is illustrated a cross-field electron gun 30 which is disposed in the environment of a transverse magnetic field B. A cathode 54 emits electrons with an initial velocity perpendicular to the electron stream 34. A control anode 56 effects the desired electric field for controlling emission and initial velocity. A collimator or velocity sorter 32 removes from the stream electrons having appreciable transverse or longitudinal velocity fluctuations. The relatively quiet electron stream 34 thus formed is projected to the right in the drawing through an environment of crossed electric and magnetic fields E and B, respectively, which along with the electron stream are all mutually orthogonal. The electron stream then passes through an input coupler which has the form of a toroidal cavity 36. The cavity 36 is excited by an input signal having a frequency in the range between zero and twice the cyclotron frequency impressed on an input lead 38. This input coupler cavity 36, as described above in connection with the discussion of FIG. 1, extracts the fast wave noise and applies the signal to the fast cyclotron wave.

The stream thus modulated drifts on into the cyclotron pump cavity 40, the operation and excitation of which will be shown and discussed below in connection with FIG. 3. It suffices to point out here that the cavity may be excited in the $TE_{201}$ mode and has walls of a non-magnetic material, such as copper. The cavity has an axial passageway or aperture for the electron stream and is longitudinally split by a pair of seams 42 and 44 which comprise an electric insulator so that the two halves of the cavity 40 are direct current isolated from each other. By this means the upper half of the cavity in the drawing may be at a lower direct current potential than the bottom half so that the electric field E and magnetic field B may be maintained within the cavity to direct and control the electron stream as it drifts therethrough. An output cavity 46, which may be similar to the input cavity 36, couples the energy from the fast cyclotron wave to an output line 48 and the stream is collected by the collector electrode 50. The cavities 36 and 46 are also split longitudinally by direct current insulating seams 49 and 51, respectively. A voltage source 52 supplies operating direct current voltages to the various components and elements shown in the figure, for example, to the cathode 54 and the electron gun accelerating plate 56, as well as to other electrodes such as the collimator 32 and the electron collector 50. An important consideration is to maintain the velocity of the electron stream constant and equal to $E/B$ at least until the electron stream has traversed the output coupler. To this end, the upper and lower halves of the cavities are connected to different potentials so that E and B and the stream are always orthogonal and so that $E/B$ always equals the desired beam velocity. The field E may be in part supplied by external means, not shown, such as large capacitor-type plates with different direct current voltages thereon, and placed above and below, as seen in the drawing, the structure shown. Similarly, the field B may be supplied by means, not shown, such as an electromagnet or permanent magnet with pole pieces in front of and in back of, as seen in the drawing, the structure shown.

Figure 3:
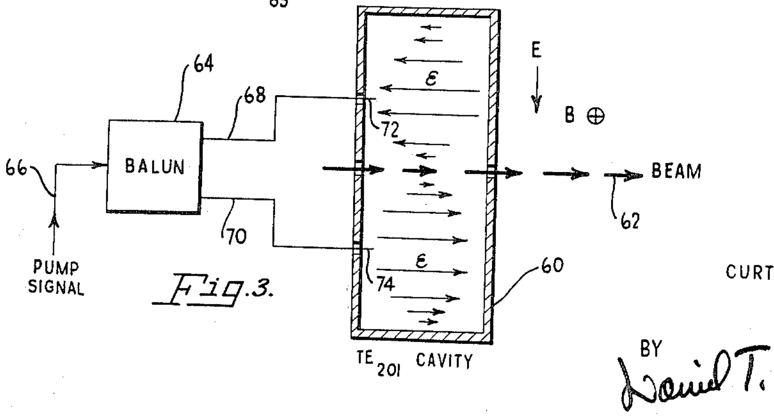
FIG. 3 is a more detailed schematic diagram of an example of a pump cavity of the present invention.

Referring to FIG. 3, an example of a cyclotron pump cavity 60 is shown in somewhat more schematic detail. An electron stream 62 is projected through the center aperture of the cavity from left to right as indicated in the drawing. The stream may be presumed to have been previously modulated as by the input cavity 36 of FIG. 2 so that its fast cyclotron wave carries the signal to be amplified. Again, the beam is in the environment, both inside and outside of the cavity, of transverse electric and magnetic fields as represented by E and B. The cavity 60 is excited in the $TE_{201}$ mode so that the radio frequency electric field vector $\xi$ is parallel to the electron stream and has an antinode symmetrically disposed on each side of the electron stream in the cavity. Other modes may be utilized provided there is a node in the center; such modes may be designated $TE_{(2n)01}$ where $n$ is any integer. The frequency of the cavity excitation is approximately twice that of the cyclotron frequency. Thus, as the drawing illustrates, there is an effectively rotating electric field vector. The "rotation" is due to the time varying and sense reversing electric field which is symmetric about the center node but has opposite sense on one side of the node with respect to the opposite side. It is also apparent that the alternating electric field has a strength substantially proportional to the distance from the center of the stream near the axis and rotates at its frequency of alternation which is twice the cyclotron frequency. With the cyclotron electron motion being in orbits lying in the plane of the drawing, since B is perpendicular thereto, a mechanism for cyclotron parametric pumping is readily apparent: the orbiting electrons having the appropriate phase are pushed into larger orbits by the synchronous time varying electric fields. A practical example of means for maintaining a desired excitation of the pump cavity 60 is a balun 64 into which the pump signal, at twice the cyclotron frequency, is impressed upon an input lead 66. The balun in a conventional manner provides 2 output signals on output leads 68 and 70 which are 180° out of phase with each other. The output lead 68 passes through an aperture in the wall of the cavity and terminates in a probe 72 in the upper half, as seen in the drawing, of the cavity 60, while the output lead 70 is terminated by a probe 74 which is symmetrically disposed with respect to the probe 72 in the lower half of the cavity 60. Thus it is readily apparent that the balun so connected to the cavity can in a push-pull manner of operation maintain the appropriate excitation. It is also noted that the parametric pumping may take place over the entire length of the cavity along the direction of the stream since by definition of the $TE_{201}$ mode when the stream is parallel to the reference axis associated with the subscript "0," there is no electric field variation in that direction.

Figure 4:
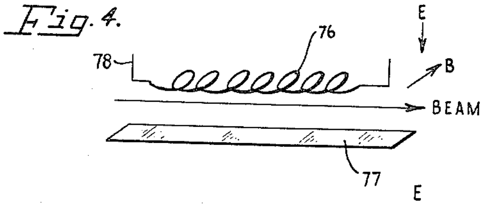
FIGS. 4 through 7 are schematic diagrams of alternative types of couplers which may be embodied in the present invention.

Referring to FIGS. 4 through 7, there are shown alternative examples of couplers. FIG. 4 illustrates a flattened helix 76 and a ground plane 77 along which is propagated the signal to be amplified from an input line 78, the preferred requisite here being that the structure be capable of coupling to the fast wave on the electron stream and that it therefore propagate the signal wave with the appropriate phase velocity.

Figure 5:
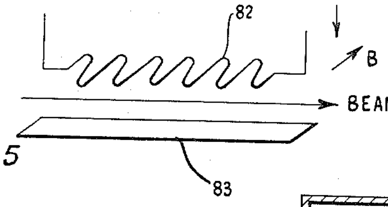

Similarly, FIG. 5 illustrates a coupling structure disposed about the beam. The particular structure shown is a zig-zag line 82 over a ground plane 83.

Figure 6:
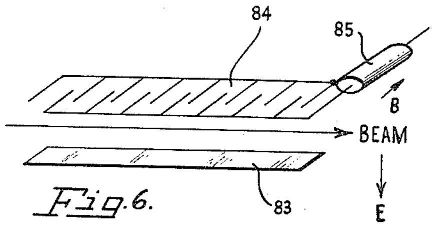

FIG. 6 illustrates an interdigital line structure 84 and its coaxial feed line 85 which is connected to two of the digits of the line. Again, a ground plane 83 may be utilized.

Figure 7:
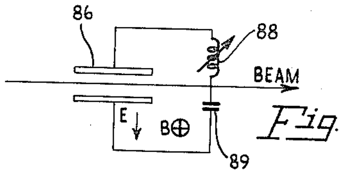

FIG. 7 is an additional example of a practical coupler. In this example, the beam passes between a pair of capacitor plates 86 which are tuned by a variable inductance 88 to the signal frequency. A direct current blocking capacitor 89 is provided to permit the capacitor plates 86 to be at different direct current potentials in order to maintain E constant across the stream. Such a coupler may couple the signal substantially entirely to the fast cyclotron wave while at the same time removing the noise therefrom. Each of the coupling structures shown in FIGS. 4 through 7 are in the environment of crossed E and B fields as indicated in the figures and each of the structures is adapted to continue the environment through the electron stream.

There has thus been disclosed a crossed-field fast cyclotron wave parametric amplifier exhibiting extremely low noise, even though it is a beam device with a hot cathode. The structure which has been described also has inherently a very broad bandwidth and produces high gain while at the same time being unconditionally stable since there is no feedback path from the output to the input. Further, and importantly, the invention as described may be utilized to amplify signals of frequencies higher, by orders of magnitude, than practical or possible with the longitudinal magnetic field fast wave device. For example, signals of the order of 10 kilomegacycles may be readily amplified by the structure here disclosed.

What is claimed is:

In a transverse magnetic and electric field electron stream parametric type of radio-frequency signal amplifier in which the fast cyclotron wave, associated with the cyclotron orbiting component of motion of the electrons in the electron stream in the environment of the transverse magnetic field, is utilized as a carrier wave for the radio-frequency signal to be amplified, a cyclotron pump comprising: a $TE_{(2n)01}$ (where $n$ is any integer) radio frequency cavity disposed about the electron stream and having entrance and exit apertures for the passage through said cavity of said stream so that said stream passes through said cavity parallel to the direction associated with the subscript "0," said cavity being of nonmagnetic material and being disposed in said transverse magnetic field so that said magnetic field is parallel to the direction associated with the subscript "1" and so that said transverse electric field is parallel to the direction associated with the subscript "$2n$" and so that the center of said stream passes through a node of a radio frequency electric field distribution in said cavity associated with the subscript "2$n$," and means for exciting said cavity in the said $TE_{(2n)01}$ mode of with a pump signal at approximately twice the cyclotron frequency associated with said cyclotron orbiting whereby said cyclotron orbiting component of motion of said electrons is electromagnetically pumped to a greater average magnitude of radius of orbiting thereby to amplify said carrier wave and radio-frequency signal.

References Cited in the file of this patent

UNITED STATES PATENTS 2,794,936 Huber ------------------- June 4, 1957

OTHER REFERENCES

Adler: "Proceedings of the IRE," June 1958, pages 1300–1301.

Ashkin: "Journal of Applied Physics," December 1958, pages 1646–1651.

Bridges: "Proceedings of the IRE," February 1958, pages 494–495.

Adler et al.: "Proceedings of the IRE," October 1958, pages 1756–1757.